US006335421B1

(12) United States Patent
Kurian et al.

(10) Patent No.: US 6,335,421 B1
(45) Date of Patent: Jan. 1, 2002

(54) PREPARATION OF POLY(TRIMETHYLENE TEREPHTHALATE) WITH LOW LEVEL OF DI(1,3-PROPYLENE GLYCOL)

(75) Inventors: Joseph Varapadavil Kurian; Yuanfeng Liang, both of Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/644,007

(22) Filed: Aug. 23, 2000

Related U.S. Application Data

(60) Provisional application No. 60/150,580, filed on Aug. 25, 1999.

(51) Int. Cl.$^7$ .............................................. C08G 63/78
(52) U.S. Cl. ...................... 528/279; 528/503; 524/783
(58) Field of Search ................................ 528/279, 503; 524/783

(56) References Cited

U.S. PATENT DOCUMENTS

| | | | | |
|---|---|---|---|---|
| 2,465,319 A | * | 3/1949 | Whinfield et al. | |
| 3,054,776 A | | 9/1962 | Higgins | 260/75 |
| 3,350,871 A | * | 11/1967 | Pierce et al. | |
| 3,671,379 A | * | 6/1972 | Evans et al. | |
| 3,904,561 A | | 9/1975 | Borman et al. | 260/22 R |
| 4,166,896 A | * | 9/1979 | Warner, Jr. | 528/301 |
| 4,250,281 A | | 2/1981 | Riecke | 525/444 |
| 4,611,049 A | * | 9/1986 | Kuratsuji et al. | 528/279 |
| 5,340,909 A | * | 8/1994 | Doerr et al. | 528/276 |
| 5,459,229 A | | 10/1995 | Kelsey et al. | 528/275 |
| 5,599,900 A | | 2/1997 | Bhatia | 528/491 |
| 5,663,281 A | * | 9/1997 | Brugel | 528/272 |

(List continued on next page.)

FOREIGN PATENT DOCUMENTS

| | | | |
|---|---|---|---|
| EP | 869 141 | | 10/1998 |
| EP | 1 016 692 A1 | | 7/2000 |
| EP | 1016692 | * | 7/2000 |
| EP | 1 016 741 A1 | | 7/2000 |
| EP | 1016741 | * | 7/2000 |
| EP | 1 046 662 | | 10/2000 |
| GB | 1075689 | * | 7/1967 |
| GB | 1 333 008 | | 10/1973 |
| GB | 1 390 793 | | 4/1975 |
| GB | 1 601 586 | | 11/1981 |
| JP | 51-140992 | | 12/1976 |
| JP | 8-232117 | | 9/1996 |
| WO | 98/23662 | * | 6/1998 |

(List continued on next page.)

OTHER PUBLICATIONS

Research Disclosure 28368 (Nov. 1987).
M. Patkar et al., "Effect of Diethylene Glycol (DEG) on the Crystallization Behavior of Poly(ethylene terephthalate) (PET)", Journal of Applied Polymer Science, vol. 47, 1749–1763 (1993).
Traub, "Synthesis and Textile Chemical Properties of Polytrimethyleneterephthalate", Dissertation (Feb. 1994) (Translation).
s. Schauhoff et al., "New Developments in the Production of Polytrimethyleneterephthalate (PTT)", Man–Made Fiber Yearbook (1996).
Zeitler, "Cyclical Oligomers in Polyester", Melliand Textilberichte (1985).
DuPont Performance Chemicals, Tyzor® Organic Titanates and Zirconates, Organic Titanates as Polyesterification Catalysts, *Technical Information*, Feb. 28, 1998.
DuPont Performance Chemicals, Tyzor® Organic Titanates and Zirconates, Esterification and Transesterification Catalyst Selection Procedures, *Technical Information*, Feb. 28, 1998.
DuPont Performance Chemicals, Tyzor® Organic Titanates and Zirconates, Esterification and Transesterification Catalyst Selection Procedures, and Comparisons with Tin Catalysts, *Technical Information*, Feb. 28, 1998.
DuPont Performance Chemicals, Tyzor® organic titanates, *Technical Information*, Oct. 1, 1998.
DuPont Performance Chemicals, Tyzor® TPT Tetra–isopropyl Titanate, *Technical Information*, Feb. 28, 1998.
DuPont Performance Chemicals, Tyzor® TBT Tetra–n–butyl Titanate, *Technical Information*, Feb. 28, 1998.
DuPont Performance Chemicals, Tyzor® Organic Titanates and Zirconates Web Page, http://www.dupont.com/tyzor/index2.html, 1998.
DuPont Performance Chemicals, Tyzor® organic titanates, *Technical Information* (Selection Chart), Feb. 28, 1998.
PCT International Search Report mailed Nov. 17, 2000.
Chemical Abstracts—English Abstract of XP–002151599.
Chemical Abstracts—English Abstract of XP–002151600.
Guokang Chen et al., "Synthesis and Characterization of Polytrimethylene Teraphthalate," Suliao Gongye 27(5), 1–3 (1999) (Recieved Jun. 4, 1999).
Guokang Chen, "The Synthesis and Properties of Polytrimthylene Terephtalate", He Cheng Xian Wei Gong Ye (China Synthetic Fibers Industry), vol. 21 No. S 26–(Oct. 30, 1999) Received Jun. 4, 1998.

(List continued on next page.)

Primary Examiner—Samuel A. Acquah
(74) Attorney, Agent, or Firm—Barbara C. Siegell; Mark D. Kuller

(57) ABSTRACT

A process of preparing poly(trimethylene terephthalate) containing less than 2.0 mole % of DPG comprising:

(a) providing a molar amount of 1,3-propanediol:$C_1$ to $C_4$ dialkyl ester of terephthalic acid of 1.2:1 to 1.9:1, (b) reacting the 1,3-propanediol with the $C_1$ to $C_4$ dialkyl ester of terephthalic, acid to form bis(3-hydroxypropyl) terephthalate monomer in the presence of 10–100 ppm (as titanium metal) of an organic titanate catalyst, by weight of the poly(trimethylene terephthalate), and (c) polymerizing the bis(3-hydroxypropyl)terephthalate monomer to obtain the poly(trimethylene terephthalate); and poly(trimethylene terephthalate) produced by the process.

20 Claims, No Drawings

U.S. PATENT DOCUMENTS

| | | | |
|---|---|---|---|
| 5,688,898 A | | 11/1997 | Bhatia ...................... 528/272 |
| 5,798,433 A | * | 8/1998 | Schmidt et al. ............ 528/279 |
| 5,856,424 A | | 1/1999 | Bowers et al. ............. 528/272 |
| 5,872,204 A | * | 2/1999 | Kuo et al. .................. 528/279 |
| 6,043,335 A | * | 3/2000 | Banach et al. ............. 528/279 |
| 6,066,714 A | | 5/2000 | Putzig ........................ 528/279 |
| 6,093,786 A | | 7/2000 | Kelsey ....................... 528/271 |

FOREIGN PATENT DOCUMENTS

| | | |
|---|---|---|
| WO | 98/49216 | 11/1998 |
| WO | 99/11709 | 3/1999 |
| WO | 99/11845 | 3/1999 |
| WO | 17265 | 3/2000 |

OTHER PUBLICATIONS

PCT Written Opinion dated May 11, 2001 from counterpart PCT/US00/21780.

Degussa, 1,3–Propanediol, "Poly–1,3–propyleneterephthalate (PPT)–A New Polyester Fiber Raw Material", Degussa AG/1,3–PD 03–002/250794, pp. 1–15 (1994).

DuPont Performance Chemicals, Tyzor® Organic Titanates and Zirconates, Esterification and Transesterification Catalyst Selection Procedures, *Technical Information*, Feb. 28, 1998.

DuPont Performance Products, Tyzor® Organic Titanates *Technical Information*, Oct. 1989.

DuPont Performance Chemicals, Tyzor® Organic Titanates and Zircornates, Organic Titanates as Polyesterification Catalysts, *Technical Information*, Feb. 28, 1986.

*Kirk–Othmer Encyclopedia of Chemical Technology*, Fourth Edition, vol. 24, pp. 326–327 (1997).

H. L. Traub, et al., "Synthesis and Properties of Fiber–Grade Poly(trimethylene terephthalate)", *Die Angewandte Makromole Kulare Chemie 230*, pp. 179–187 (1995).

* cited by examiner

PREPARATION OF POLY(TRIMETHYLENE TEREPHTHALATE) WITH LOW LEVEL OF DI(1,3-PROPYLENE GLYCOL)

PRIORITY

This application claims priority benefit of U.S. Provisional Application 60/150,580, filed Aug. 25, 1999.

FIELD OF THE INVENTION

This invention relates to an improved process for the preparation of poly(trimethylene terephthalate) from 1,3-propanediol and a $C_1$–$C_4$ dialkyl terephthalate in which the levels of units from di(1,3-propylene glycol) ("DPG") in the poly(trimethylene terephthalate) are reduced.

TECHNICAL BACKGROUND OF THE INVENTION

Preparation of poly(trimethylene terephthalate) (3GT) polyester resins by (a) the transesterification of a $C_1$–$C_4$ dialkyl ester of terephthalic acid with 1,3-propanediol, or by the esterification of terephthalic acid with 1,3-propanediol, followed by (b) polycondensation is well known in the art.

Generally, in the transesterification reaction, a $C_1$–$C_4$ dialkyl ester of terephthalic acid and 1,3-propanediol are reacted in the presence of a transesterification catalyst at elevated temperature and atmospheric pressure to form bis-(3-hydroxypropyl)terephthalate monomer, along with small amounts of oligomer and $C_1$–$C_4$ monoalcohol byproduct. In the esterification reaction, terephthalic acid (TPA) and 1,3-propanediol are reacted in the optional presence of an esterification catalyst at elevated temperature and at atmospheric or superatmospheric pressure to form bis-(3-hydroxypropyl)terephthalate monomer, along with small amounts of oligomer and water byproduct. The bis-(3-hydroxypropyl)terephthalate monomer and any oligomer can then be polymerized at higher temperature under reduced pressure in the presence of a polycondensation catalyst to form the desired resin.

During the process for the preparation of 3GT (transesterification, esterification and polycondensation reactions), di(1,3-propylene glycol) can be formed from intermolecular dehydration of 1,3-propanediol. This di(1,3-propylene glycol) can be incorporated into the 3GT polymer chain which affects the properties of the resulting polymer, with respect to, for example, melting temperature, glass transition temperature, crystallinity, density, dyeablity, processability, etc. The effects of the analogous impurity, diethylene glycol (DEG), on poly(ethylene terephthalate) (PET) polymer properties are well documented in the literature. For commercial grade PET the DEG levels are usually around 2–4 mol %.

Processes for the preparation of polyesters, including 3GT, have been disclosed in many patents. Some disclose use of tin and titanium catalysts.

U.S. Pat. No. 2,465,319 mentions many types of catalysts including tin. Research Disclosure 28368 (November 1987) discloses preparation of poly(alkylene 2,6-napthalenedicarboxylate) polyesters using titanium alkoxides and dibutyl tin dilaurate, etc.

U.S. Pat. Nos. 3,350,871 and 3,671,379, and UK Patent Specification No. 1,075,689, Example 1, show preparation of poly(trimethylene terephthalate) from dimethyl terephthalate and trimethylene glycol using a catalyst prepared by dissolving 2.5 grams of sodium in 300 ml of n-butanol, adding 37 grams of tetrabutyl titanate, and diluting to 500 ml with n-butanol. Titanium dioxide is added as a delusterant.

U.S. Pat. No. 4,166,896 describes dibutyl tin oxide as a catalyst. U.S. Pat. No. 4,611,049 describes a process for producing an aromatic polyester using an organometallic catalyst selected from the group consisting of organotitanium compounds and organotin compounds, and at least one promoter selected from the group consisting of organic sulfonic acids and aliphatic carboxylic acids. Tetrabutyl titanate, tetraisopropyl titanate, dibutyl tin oxide and butylhydroxytin oxide are preferred.

U.S. Pat. No. 5,340,909 describes preparation of poly(1,3-propylene terephthalate) using tin and titanium catalysts. Catalysts mentioned include tetrabutyl titanate, tetraisopropyl titanate, butylstannoic acid, butyltin tris (2-ethylhexoate), stannous octoate, dibutyltin tris(2-etholhexoate), stannous octoate, dibutyltin oxide and methylene bis(methyltin oxide). Tetrabutyl titanate is used in both control and demonstration examples.

U.S. Pat. No. 5,663,281 describes a process for preparing polyester polymers. At column 6 it states that (trans) esterification reactions from 1,4-butanediol using tetrabutyl titanate are satisfactory, but risk forming undesirable by-products, whereas with 1,3-propylene glycol the risk of forming undesirable by-products using tetraalkyl titanates as catalyst is not as great and, thus, "more traditional" catalysts such as tetrabutyl titanate and antimony oxide can be used. Monobutyl tin oxide is used to catalyze 1,4-butanediol reactions.

U.S. Pat. No. 5,798,433 discloses a method of synthesizing polypropylene terephthalate using 30–200 ppm titanium in the form of an inorganic esterification catalyst containing at least 50 mole % $TiO_2$ precipitate, blocking the esterification catalyst after esterification by adding 10–100 ppm phosphorus in the form of a phosphorus-oxygen compound, and then performing precondensation and polycondensation in the presence of 100–300 ppm antimony. Table 1 shows a comparative example using titanium tetrabutylate as an esterification catalyst with antimony triacetate as a polycondensation catalyst.

U.S. Pat. No. 5,872,204 describes preparation of poly(1,3-propylene terephthalate) using ethylene glycol titanate as an esterification catalyst and polymerizing the resultant monomer in the presence of antimony acetate. At column 2 it is stated that ethylene glycol titanate does not hydrate, whereas tetrabutyl titanate does. The examples show use of ethylene glycol titanate, whereas comparative example 1 may have been directed to use of tetrabutyl titanate (compare column 12, lines 46 and 63).

None of these references mention DPG formation, specify DPG levels, nor cite the impact of DPG content on polymer end use properties, and none disclose methods to minimize DPG generation during the polymer preparation processes.

U.S. Pat. No. 5,8365,424 described preparation of polyesters containing low levels of diethylene glycol wherein the reaction is carried out without a titanium catalyst.

U.S. Pat. No. 6,043,335 describes preparation of polyethylene and polybutylene terephthalates (which are stated to not have high levels of undesirable by-products) using a catalyst composition comprising a combination of a titanium-based compound, a zirconium-based compound and a phosphate-forming compound.

WO 98/23662 states that the condensation polymerization of polytrimethylene terephthalate "usually generates as much as about 4 mole percent of the bis(3-hydroxypropyl) ether which, in effect, becomes a comonomer and is incorporated into the polyester chain."

EP 1 016 692 and 1 016 741 describe polyester resin and fibers produced with no more than 2 weight % bis(3- hydroxypropyl) ether (DPG derived repeating unit). These documents describe use of metal catalysts such as titanium alkoxides (e.g., titanium tetrabutoxide or titanium tetraisopropoxide), antimony acetate or antimony trioxide. The preferred ester exchange catalysts are stated to be calcium acetate, magnesium acetate, zinc acetate and titanium acetate. In addition, they describe titanium, tin or antimony polycondensation catalysts, preferring titanium tetrabutoxide.

All of the aforementioned documents are incorporated herein by reference.

SUMMARY OF THE INVENTION

This invention is directed to improved process for preparing 3GT polyester having high strength, excellent elastic recovery, easy dyeability and containing low levels of DPG, and the resultant poly(trimethylene terephthalate) polyester.

Specifically, the invention is directed to a process of preparing poly(trimethylene terephthalate) containing less than 2.0 mole % of DPG. The process comprises:

(a) providing a molar amount of 1,3-propanediol:$C_1$ to $C_4$ dialkyl ester of terephthalic acid of 1.2:1 to 1.9:1;

(b) reacting the 1,3-propanediol with the $C_1$ to $C_4$ dialkyl ester of terephthalic acid to form bis(3-hydroxypropyl) terephthalate monomer in the presence of 10–100 ppm (as titanium metal) of an organic titanate catalyst, by weight of the poly(trimethylene terephthalate); and (c) polymerizing the bis(3-hydroxypropyl)terephthalate monomer to obtain the poly(trimethylene terephthalate).

Preferably, the molar amount is 1.4:1 to 1.8:1.

Preferably the catalyst comprises one or more titanium tetrahydrocarbyloxide catalyst, most preferably tetraisopropyl titanate.

Preferably the polymerizing the bis(3-hydroxypropyl) terephthalate monomer is carried out using an effective amount of the organic titanate catalyst, most preferably using 0–100 ppm (as titanium metal) of the organic titanate catalyst (by weight of the poly(trimethylene terephthalate)).

Preferably the process is carried out so that the product polyester contains less than 1 mole % DPG.

The invention is also directed to poly(trimethylene terephthalate) produced by the process.

Other and further objects, features, and advantages of the present invention will appear more fully from the following description.

DETAILED DESCRIPTIONS OF THE INVENTION

This invention relates to an improved process for the preparation of poly(trimethylene terephthalate) from 1,3-propanediol ("PDO") and a $C_1$–$C_4$ dialkyl terephthalate in which the levels of units from di(1,3-propylene glycol) ("DPG") (also known as "bis(3-hydroxypropyl) ether" or "BPE") are reduced. Such units have also been referred to as "copolymerized BPE". These units in the poly(trimethylene terephthalate) polymer actually have the formula

—(OCH$_2$CH$_2$CH$_2$OCH$_2$CH$_2$CH$_2$O)—, but are called "DPG" herein for convenience.

The most preferred polymer is poly(trimethylene terephthalate). Also preferred are blends and copolymers of poly(trimethylene terephthalate). The polymer of the invention contains preferably about 80% or more of poly (trimethylene terephthalate) in mole percentage. It may be modified with up to 20 mole percent of polyesters made from other diols or diacids. The other diacids include isophthalic acid, 1,4-cyclohexane dicarboxylic acid, 2,6-naphthalene dicarboxylic acid, 1,3-cyclohexane dicarboxylic acid, succinic acid, glutaric acid, adipic acid, sebacic acid, 1,12-dodecane dioic acid, and the derivatives thereof such as the dimethyl, diethyl, or dipropyl esters of these dicarboxylic acids. The other diols include ethylene glycol, 1,4-butane diol, 1,2-propanediol, diethylene glycol, triethylene glycol, 1,3-butane diol, 1,5-pentane diol, 1,6-hexane diol, 1,2-, 1,3- and 1,4-cyclohexane dimethanol, and the longer chain diols and polyols made by the reaction product of diols or polyols with alkylene oxides.

The 3GT polymers of the invention have less than 2 mole % DPG, and most preferably less than 1 mole %.

The intrinsic viscosity of the polymers of the invention are in the range of 0.4–2.0 dl/g, preferably in the range of 0.6–2.0 dl/g and most preferably in the range of 0.7–2.0 dl/g.

To achieve the object of the present invention, 3GT polyester is prepared utilizing specific ratios of reactants and in the presence of specific catalyst(s).

The mole ratio (PDO: $C_1$ to $C_4$ dialkyl esters of terephthalic acid) of starting materials is 1.9:1 or less, preferably 1.8:1 or less, and is preferably 1.2:1 or higher, most preferably 1.4:1 or higher. Operation at higher molar ratios than 1.9:1 leads to increased amounts of DPCJ formed. Generally, in this embodiment bis(3-hydroxypropyl) terephthalate monomer is prepared using 10–100 ppm titanate catalyst (as titanium metal), by weight of the poly (trimethylene terephthalate).

Of the various $C_1$ to $C_4$ dialkyl esters of terephthalic acid, dimethyl terephthalate (DMT) is preferred.

The preferred titanium compounds are organic titanate compounds. Titanium tetrahydrocarbyloxides, also referred to as tetraalkyl titanates herein, are presently most preferred organic titanium compounds because they are readily available and effective. Examples of suitable titanium tetrahydrocarbyloxide compounds include those expressed by the general formula Ti(OR)4 where each R is individually selected from an alkyl or aryl radical containing from 1 to about 30, preferably 2 to about 18, and most preferably 2 to 12 carbon atoms per radical and each R can be the same or different. Titanium tetrahydrocarbyloxides in which the hydrocarboxyl group contains from 2 to about 12 carbon atoms per radical which is a linear or branched alkyl radical are most preferred because they are relatively inexpensive, more readily available, and effective in forming the solution. Suitable titanium tetrahydrocarbyloxides include, but are not limited to, titanium tetraethoxide, titanium tetrapropoxide, titanium tetraisopropoxide (also known as "tetraisopropyl titanate"), titanium tetra-n-butoxide, titanium tetrahexoxide, titanium tetra 2-ethylhexoxide, titanium tetraoctoxide, and combinations of two or more thereof.

Titanium tetrahydrocarbyloxides suitable for use in the present invention can be produced by, for example, mixing titanium tetrachloride and an alcohol in the presence of a base, such as ammonia, to form the titanium tetracarbyloxide or tetraalkyl titanate. The alcohol can be ethanol, n-propanol, isopropanol, n-butanol, or isobutanol. Titanium tetrahydrocarbyloxides thus produced can be recovered by first removing by-product ammonium chloride by any means known to one skilled in the art such as filtration followed by distilling the titanium tetrahydrocarbyloxides from the reaction mixture. This process can be carried out at a temperature in the range of from about 0 to about 150° C. Titanates having longer alkyl groups can also be produced by transesterification of those having R groups up to $C_4$ with alcohols having more than 4 carbon atoms per molecule.

The preferred transesterification catalyst in the process of the present invention is tetraisopropyl titanate (TFPT). Tetraisopropyl titanate is commercially available as TYZOR® TPT from E.I. du Pont de Nemours and Company, Wilmington, Del., U.S.A. ("DuPont").

After the initial stage of the 3GT preparation process, di(1,3-propylene glycol) formation, the second step, polycondensation (step c) to finished polymer is carried out in the presence of any of the customarily employed polycondensation catalysts. Organic titanates are preferred. Tetraisopropyl titanate is most preferred.

Polycondensation is preferably carried out using 10–100 ppm titanate catalyst (as titanium metal), by weight of the poly(trimethylene terephthalate).

It is believed that the use of tetraisopropyl titanate (TPT) as both the transesterification catalyst and polycondensation catalyst leads to shortened reaction times versus the use of tetrabutyl titanate (TBT).

The transesterification is customarily carried out at atmospheric pressure in the temperature range of from 150–250° C. A preferred temperature range is from 200–220° C.

The polycondensation reaction is customarily carried out at reduced pressures (below 1.0 mmHg) and at temperatures of from 230–280° C. Temperatures from 240–260° C. are preferred.

Additives known in the art such as antioxidants, UV stabilizers, pigments (e.g., $TiO_2$, etc.), flame retardants, antistats, dyes, and compounds that enhance the process, etc., may be used with this invention.

Use of a phosphate or a phosphate-forming compound, such as described in EP 1 016 741, EP 1 016 692 and U.S. Pat. No. 5,798,433, all of which are incorporated herein by reference, is not desirable with this invention.

Use of a promoter i(organic sulfonic acids and aliphatic carboxylic acids) such as described in U.S. Pat. No. 4,611, 049, incorporated herein by reference, is unnecessary, and probably undesirable with this invention.

Use of an aromatic organosphosphite and hindered phenol such as described in U.S. Pat. No. 6,043,335, incorporated herein by reference, is also unnecessary.

The polyesters of this invention have excellent crystallinity. The lower levels of DPG result in higher strength. These polyesters are useful in many of the end uses described in the art, particularly in fibers and yarns where they provide excellent strength. They are also useful in engineering resins, films and nonwovens, etc.

EXAMPLES

The following examples are presented to demonstrate the invention, but are not intended to be limiting. Therein, unless otherwise indicated, all percentages, parts, etc. are by weight.

Dimethylterephthalate was obtained from DuPont (DMT, 99.9%). Tetraisopropyl titanate was also obtained from Dupont (Tyzor® TPT organic titanate).

DPG content was measured using a Varian 3400 Gas Chromatograph (with flame ionization detector and all glass flow system from injector to detector). The Gas Chromatographic Column was 1.83 meter (length, 6 feet)×2 mm (inside diameter)×0.25 inch OD (outside diameter), glass, packed with 10% Carbowax 20M on 80/100 mesh Supelcoport. The column section in the injector and detector (beyond ferrule) did not have packing. The Septa was Thermogreen, LB-2 Part No. 2-0653M Supelco Inc., Bellefronte, Pa.

The following apparatus were used:
(1) Analytical Balance—capable of weighing 2 grams with a sensitivity of +/−0.0001 g.
(2) Reflux Apparatus—for heating samples, consisting of the following items available from Lab Glass, Inc.: A. Boiling Flask—25 ml round bottom with 14/20 ST joint, B. Heating mantle—with Variac autotransformer, and C. Condenser—water cooled.
(3) Hypodermic Syringe, 10 ml.
(4) Syringe—10 Ul.
(5) Stoppers (Teflon).
(6) Automatic Pipet—2-ml capacity.
(7) Pipet—disposable, 1-ml capacity.
(8) Injector Liner, glass.
(9) Vortex Shaker, Fisher Scientific Co.
(10) Centrifuge, Laboratory with 1.5 ml capacity.
(11) Vial, 2 ml. screw thread, Varian Part 66-000104-00.
(12) Auto sampler vial caps, Varian Part 16-00698-00.

The following reagents and materials were used:
1. 2-Aminoethanol (Ethanolamine or 2AE).
2. 2-Propanol (Isopropanol)—ACS Reagent Grade.
3. Benzyl Alcohol (BA)—Certified Grade, Fisher Cat. No. A396-500.
4. Dipropylene Glycol (DPG)—Degussa.
5. Boiling Chips—Boileezer, Fisher Scientific Cat. No. B-365.

Digestion Standard 0.2% was prepared by (a) weighing 4.000 g+/−0.005 g Benzyl Alcohol (BA) into a 50 ml beaker, (b) quantitatively transferring this to a 2000 ml volumetric flask, (c) filling the flask about ¾ full with ethanolamine (2AE) and mixing it by swirling, (d) diluting to the mark with ethanolamine (2AE), (e) adding a 1 in. stirring bar and stirring 1 hour to mix well. Prior to use the Digestion Standard was validated.

A 1.25% DPG Calibration Stock Solution was prepared by (a) weighing 6.25 grams dipropylene glycol into a 100 ml beaker, (b) placing a 1000 ml beaker on a p-4000 top load balance and tare, (c) quantitatively transferring the DPG from the 100 ml beaker on the balance, using ethanolamine (2AE) to rinse the DPG from the 100 ml beaker to the 1000 ml beaker, (d) adding ethanolamine (2AE) to 1000 ml beaker on balance to a total weight of 500.00 grams, (e) placing the beaker containing DPG and ethanolamine (2AE) on a magnetic stirrer and mixing for one hour, (f) weighing about one gram into a 25 ml flask and recording the weight to the fourth decimal, (g) running as regular sample and comparing results to the Stock Solution in service to confirm that it can be used, (h) transferring mixed DPG and ethanolamine (2AE) solution to a dispensette bottle, fitted with a 2.0 ml Brinkmann Dispensette, and (i) adjusting the Brinkmann Dispensette to deliver exactly 1.00 gram.

A 1.25% Calibration Working Solution was prepared by (a) dispensing exactly 1.00 gram of the 1.25% DPG Calibration Stock Solution into a 25 ml reaction flask, and weighing to get exactly 1.000 gms, (b) dispensing 2 ml of Digestion Standard into the flask with the one gram of Calibration Stock Solution, (c) adding 10 ml 2-propanol to the flask with the DPG and Digestion Standard, (d) closing with a Teflon stopper tightly and placing the flask on a Vortex-Genie vibrator and shaking for 30 seconds, (e) making a new solution when new digestion standard is added to the dispensette bottle.

Test specimens were 1+/−0.1 g of polymer. With DPG levels above 2% proportionally less sample was used. The specimen was weighed to the fourth decimal, and then transferred to a reaction flask, and 3 or 4 boileezers were added. Then, 2.00 ml of Digestion Standard was added from an automatic pipet.

The Reaction Flask was fit with the condenser, making sure that the ground glass joints fit tightly, and cold water flowed through the condenser jacket. The heating mantle Place around the flask, and the flask was heated at a low reflux (2–3 drops/min) for 20+/−1 min. The Variac control reflux rate was 2–3 drops/min. The flask and condenser were removed from the heating mantle. As soon as the boiling stopped, the inside of the condenser was washed with 10 ml of 2-Propanol. The first portion of the 2-Propanol was added slowly with shaking. As soon as solid started to form in the flask, the rest of the 2-Propanol was added as rapidly as possible. The condenser was removed from the flask, and stopped with a Teflon Stopper and shaken on Vortex Shaker for a minimum of 15 seconds. The solution in the digestion flask was transferred to the centrifuge tube. The centrifuge tube was placed in the freezer for 10 minutes, and then was centrifuged for 5 minutes or until the solid separated. The centrifuge tube was removed from the centrifuge and the clear portion of sample was transferred into the auto sample vial using a disposable pipete and then capped.

The Gas Chromatograph was set up according to the manufacturer's operation manual instructions, using the following conditions. The Gas Chromatograph had an injector temperature, range of 250±50° C., a detector temperature, range of 300±50° C., and a carrier gas flow, approximately 30 ml/min. The oven temperature was 190° C. for 5 minutes, then was raised to 210° C. at 10 degrees/minute and held for 8 minutes. The Range was 10 and the attenuation was 2.

The Integrator parameters were set in accordance with the instrument operating manual and the observed gas chromatographic curve.

1. Report unidentified peaks, no
2. Unidentified peak factor—0.000000
3. Noise Level, set to the minimum allowed value >100
4. Sample ID—DPG
5. Subtract blank baseline—no
6. Peak reject value—1000
7. Signal to noise ratio—5
8. Tangent peak height—10
9. Initial peak width—2

The chromatographic column was conditioned before use. The column was installed in the chromatograph with the temperature at 30° C. and was allowed to equilibrate for about 15 minutes. The oven temperature was increased to 225° C. The recorder was started and let to scan until a smooth and straight line was obtained. Then, the oven was set to the initial column temperature.

Manual calibration was performed using the 1.25% standard solution to calibrate the method. The response factor was calculated from the last two standard solutions run using the following formula to calculate a new response factor:

$$\frac{1.25}{\text{DPG AREA COUNTS/BA AREA COUNTS}} = \text{New Factor}$$

For example:

| PEAK NO. | PEAK NAME. | TIME (MIN) | RESULTS (%) | AREA COUNTS |
|---|---|---|---|---|
| 1. | BA | 3.206R | INT. STS. | 171912 |
| 2. | DPG | 8.532 | 1.010 | 179391 |
|  | TOTALS: |  | 1.010 | 103810312 |

$$\frac{1.25}{\frac{179391}{171912}} = 1.198 < -\text{NEW SLOPE FACTOR} -$$

This new Slope Factor was entered into the GC and a standard sample was run.

Once the Gas Chromatograph was set up, calibrated and conditioned, approximately 1 ml of each specimen or standard was transferred to an automatic sampler vial using a disposable pipet for each specimen. The vials were placed in the sampler and the analysis was started. Specimens were automatically run and calculated as % DPG. Then, the results were divided by sample weight.

For manual DPG calculations, the DPG/BA ratio was calculated for each specimen to the nearest 0.01 unit, using the following equation:

$$r=j/h$$

where: r=the ratio, j=the integrated area for DPG, and h=the integrated area for BA. The DPG for each specimen was calculated to the nearest 0.01 weight %, using the following equation:

$$P=R \times F/W$$

where: P=DPG, weight %, R=DPG/BA ratio, F=slope factor and W=specimen weight.

The precision was C.V.≦1% DPG, and the range of the method is 0.5 to 2% DPG by weight, and smaller samples were used when DPG was greater than 2%.

The intrinsic viscosity was determined using a 0.4% by weight/volume solution (weight of polymer per unit volume of solution) of the polymer in 50/50 trifluoroacetic acid/dichloromethane using a Viscotek RTM Model Y-900 differential viscometer, at a temperature of 19° C. The viscometer is calibrated with samples of known viscosity.

Example 1

Batch preparation of poly(trimethylene terephthalate) from dimethyl terephthalate and 1,3-propanediol with Tyzor® TPT as transesterification catalyst and a mole ratio of 1,3-propanediol:DMT of 1.4:1.

A 250 ml flask was charged with 117 g of dimethylterephthalate, 67 g of 1,3-propanediol for a mole ratio of 1,3-propanediol:DMT of 1.4:1, and 37 mg Tyzor® TPT. The temperature was raised to 210° C. and held for 1.5 hours. Methanol generated was removed as a liquid condensate by distillation.

After evolution of methanol had ceased, the resulting monomer, bis(3-hydroxypropyl)terephthalate, was polymerized in the same flask at a temperature of 250° C. and a pressure of 0.2 mm Hg for 2 hours. The obtained poly (trimethylene terephthalate) had an intrinsic viscosity of 0.76 dl/g. The DPG content was 0.04 mole %.

Example 2

Batch preparation of poly(trimethylene terephthalate) from dimethyl terephthalate and 1,3-propanediol with Tyzor® TPT as transesterification catalyst and a mole ratio of 1,3-propanediol:DMT of 1.8:1.

A 250 ml flask was charged with 58.5 g of dimethyl terephthalate, 40 g of 1,3-propanediol for a mole ratio of 1,3-propanediol:DMT of 1.8:1, and 18.5 mg Tyzor® TPT. The temperature was raised to 210° C. and held for 1.5 hours. Methanol generated was removed as a liquid condensate by distillation.

After evolution of methanol had ceased, the resulting monomer, bis(3-hydroxypropyl)terephthalate, was polymerized in the same flask at a temperature of 250° C. and a pressure of 0.2 mm Hg for 2 hours. The obtained poly(trimethylene terephthalate) had an intrinsic viscosity of 0.96 dl/g. The DPG content was 0.14 mole %.

Example 3

Batch preparation of poly(trimethylene terephthalate) from dimethyl terephthalate and 1,3-propanediol with Tyzor® TPT as transesterification catalyst and a mole ratio of 1,3-propanediol:DMT of 1.4:1.

A 25 gallon autoclave was charged with 100 lbs. of dimethyl terephthalate, 55 lbs. of 1,3-propanediol for a mole ratio of 1,3-propanediol:DMT of 1.4:1 and 14.5 g of Tyzor® TPT. The temperature was raised to 210° C. and held for 3 hours. Methanol generated was removed as a liquid condensate by distillation.

After evolution of methanol had ceased, the resulting monomer, bis(3-hydroxypropyl)terephthalate, was transferred to a different clave and polymerized at a temperature of 250° C. and a pressure of 0.95 mm Hg for 4.5 hours. The obtained poly(trimethylene terephthalate) resin was pelletized. The intrinsic viscosity of the polymer was 0.84 dl/g. The DPG content was 0.42 mole %.

Comparative Example 1

Preparation of poly(trimethylene terephthalate) from dimethyl terephthalate and 1,3-propanediol with Tyzor® TPT as transesterification catalyst and a mole ratio of 1,3-propanediol:DMT of 2:1.

A 25 gallon autoclave was charged with 100 lbs. of dimethyl terephthalate, 78 lbs. of 1,3-propanediol for a mole ratio of 1,3-propanediol:DMT of 2:1 and 14.5 g of Tyzor® TPT. The temperature was raised to 210° C. and held for 2 hours 15 min. Methanol generated was removed as a liquid condensate by distillation.

After evolution of methanol had ceased, the resulting monomer, bis(3-hydroxypropyl)terephthalate, was transferred to a different clave and polymerized at a temperature of 250° C. and a pressure of 0.95 mm Hg for 6 hours. The obtained poly(trimethylene terephthalate) resin was pelletized. The intrinsic viscosity of the polymer was 0.88 dl/g and DPG content was 4.0 mole %.

Comparative Example 2

Preparation of poly(trimethylene terephthalate) from dimethyl terephthalate and 1,3-propanediol with a mixture of mono and dibutylphosphate titanium complexes. (n-BuO)xP=O(OH)$_{3-x}$, where x=1 or 2 about 50/50) as transesterification catalyst and a mole ratio of 1,3-propanediol:DMT of 1.4:1.

A 25 gallon autoclave was charged with 100 lbs. of dimethyl terephthalate, 55 lbs. of 1,3-propanediol for a mole ratio of 1,3-propanediol:DMT of 1.4:1 and 28 g of the mixed butylphosphate titanium complex. The temperature was raised to 210° C. and held for 3.5 hours. Methanol generated was removed as a liquid condensate by distillation.

After evolution of methanol had ceased, the resulting monomer, bis(3-hydroxypropyl)terephthalate, was transferred to a different clave and polymerized at a temperature of 250° C. and a pressure of 1.2 mm Hg for 7.5 hours. The obtained poly(trimethylene terephthalate) resin was pelletized. The intrinsic viscosity of the polymer was 0.66 dl/g and DPG content was 3.6 mole %.

TABLE 1

| | DMT or TPA | Mole Ratio (PDO/DMT or TPA) | Catalyst | DPG Content |
|---|---|---|---|---|
| Example 1 | DMT | 1.4 | Tyzor ® TPT | 0.04% |
| Example 2 | DMT | 1.8 | Tyzor ® TPT | 0.14% |
| Example 3 | DMT | 1.4 | Tyzor ® TPT | 0.42% |
| Comp. Expl. 2 | DMT | 2 | Tyzor ® TPT | 4.0% |
| Comp. Expl. 2 | DMT | 1.4 | Dibutylphosphate titanium complex | 3.6% |

In Example 1, the process of the invention required 90 minutes at 210° C. for transesterification, followed by 120 minutes (at 250° C. and 0.2 mm Hg) to yield a significantly higher intrinsic viscosity of 0.76 dl/g. In Example 2, with the same temperature, time and pressure conditions as in Example 1, with a higher, but yet acceptable (1.8:1), PDO:DMT ratio yielded a intrinsic viscosity of 0.96 dl/g. Example 3, a scale up of Example 1, required longer times than the smaller scale Example 1, but still yielded higher intrinsic viscosity.

Comparative Example 2, with the mixed mono and dibutylphosphate titanium complex required 3.5 hours for transesterification and 7.5 hours for polycondensation to an intrinsic viscosity of 0.664 dl/g. DPG level was an unacceptably high 3.6%. The process had a longer reaction time.

As illustrated in Example 3 versus Comparative Example 1, the mole ratio of 3G/DMT during the transesterification reaction leads to a large difference in the amount of DPG present in the polymer product. The higher mole ratio of 3G/DMT leads to a higher amount of DPG in the final polymer.

As illustrated in Example 3 versus Comparative Example 2, the type of transesterification catalyst has been found to have a great impact on DPG generation in DMT based 3GT polymer processes. Both Tyzor® TPT and the mixed butylphosphate titanium complex are titanium complexes, but with different ligands attached to the titanium atom. Use of Tyzor® TPT as catalyst can significantly reduce the level of DPG in DMT based 3GT polymer, compared to using the mixed butylphosphate titanium complex as catalyst.

While the above examples demonstrate a batch process, the processes of this invention are also applicable to continuous processes such as shown in co-pending U.S. patent application Ser. Nos. 09/502,322 , 09/502,642 and 09/503,599, all of which are incorporated herein by reference.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A process of preparing poly(trimethylene terephthalate) comprising:

(a) providing a molar amount of 1,3-propanediol:$C_1$ to $C_4$ dialkyl ester of terephthalic acid of 1.2:1 to 1.9: 1;

(b) reacting the 1,3-propanediol with the $C_1$ to $C_4$ dialkyl ester of terephthalic acid to form bis(3-hydroxypropyl) terephthalate monomer in the presence of 10–100 ppm (as titanium metal), by weight of the poly(trimethylene terephthalate), of tetraisopropyl titanate catalyst; and (c) polymerizing the bis(3-hydroxypropyl)terephthalate monomer in the presence of 10–100 ppm (as titanium metal), by weight of the poly(trimethylene terephthalate), of tetraisopropyl titanate catalyst to obtain poly(trimethylene terephthalate) having an IV of 0.7 to 2.0 dl/g and containing less than 2.0 mole % of DPG.

2. The process of claim 1 wherein the molar amount is 1.4:1 to 1.8:1.

3. The process of claim 1 wherein the resultant poly(trimethylene terephthalate contains less than 1 mole % DPG.

4. The process of claim 2 wherein the resultant poly(trimethylene terephthalate contains less than 1 mole % DPG.

5. A process of preparing poly(trimethylene terephthalate) comprising:

(a) providing a molar amount of 1,3-propanediol:$C_1$ to $C_4$ dialkyl ester of terephthalic acid of 1.2:1 to 1.9:1;

(b) reacting the 1,3-propanediol with the $C_1$ to $C_4$ dialkyl ester of terephthalic acid to form bis(3-hydroxypropyl) terephthalate monomer in the presence of 10–100 ppm (as titanium metal), by weight of the poly(trimethylene terephthalate), of tetraisopropyl titanate catalyst; and (c) polymerizing the bis(3-hydroxypropyl)terephthalate monomer in the presence of catalyst consisting essentially of an effective amount of tetraisopropyl titanate catalyst, by weight of the poly(trimethylene terephthalate) to obtain poly(trimethylene terephthalate) having an IV of 0.7 to 2.0 dl/g and containing less than 2.0 mole % of DPG.

6. The process of claim 5 wherein the effective amount of the organic titanate catalyst is 10–100 ppm (as titanium metal) of the organic titanate catalyst by weight of the poly(trimethylene terephthalate).

7. The process of claim 5 wherein the resultant poly(trimethylene terephthalate contains less than 1 mole % DPG.

8. The process of claim 6 wherein the resultant poly(trimethylene terephthalate contains less than 1 mole % DPG.

9. The process of claim 5 wherein the molar amount is 1.4:1 to 1.8:1.

10. The process of claim 6 wherein the molar amount is 1.4:1 to 1.8:1.

11. The process of claim 7 wherein the molar amount is 1.4:1 to 1.8:1.

12. The process of claim 8 wherein the molar amount is 1.4:1 to 1.8:1.

13. The process of claim 1 wherein the resultant poly(trimethylene terephthalate) has an IV of 0.84 dl/g or higher.

14. The process of claim 1 wherein the resultant poly(trimethylene terephthalate) has an IV of 0.88 dl/g or higher.

15. The process of claim 4 wherein the resultant poly(trimethylene terephthalate) has an IV of 0.84 dl/g or higher.

16. The process of claim 4 wherein the resultant poly(trimethylene terephthalate) has an IV of 0.88 dl/g or higher.

17. The process of claim 5 wherein the resultant poly(trimethylene terephthalate) has an IV of 0.84 dl/g or higher.

18. The process of claim 5 wherein the resultant poly(trimethylene terephthalate) has an IV of 0.88 dl/g or higher.

19. The process of claim 11 wherein the resultant poly(trimethylene terephthalate) has an IV of 0.84 dl/g or higher.

20. The process of claim 12 wherein the resultant poly(trimethylene terephthalate) has an IV of 0.88 dl/g or higher.

* * * * *